US012100903B2

(12) United States Patent
Kim et al.

(10) Patent No.: US 12,100,903 B2

(45) Date of Patent: Sep. 24, 2024

(54) ANTENNA STRUCTURE, ANTENNA ARRAY AND DISPLAY DEVICE INCLUDING THE SAME

(71) Applicant: DONGWOO FINE-CHEM CO., LTD., Jeollabuk-do (KR)

(72) Inventors: Jong Min Kim, Gyeonggi-do (KR); Young Su Lee, Gyeonggi-do (KR); Yoon Ho Huh, Seoul (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 166 days.

(21) Appl. No.: 17/727,984

(22) Filed: Apr. 25, 2022

(65) Prior Publication Data

US 2022/0247083 A1 Aug. 4, 2022

Related U.S. Application Data

(63) Continuation of application No. PCT/KR2020/014366, filed on Oct. 21, 2020.

(30) Foreign Application Priority Data

Oct. 28, 2019 (KR) ........................ 10-2019-0134903
Jul. 20, 2020 (KR) ........................ 10-2020-0089718
Oct. 13, 2020 (KR) ........................ 10-2020-0131656

(51) Int. Cl.

*H01Q 9/28* (2006.01)
*H01Q 1/24* (2006.01)
*H01Q 21/00* (2006.01)

(52) U.S. Cl.

CPC ............ *H01Q 9/285* (2013.01); *H01Q 1/241* (2013.01); *H01Q 21/0025* (2013.01)

(58) Field of Classification Search

None

See application file for complete search history.

(56) References Cited

U.S. PATENT DOCUMENTS 10,298,336 B1 * 5/2019 Tabatabai ............... H01Q 21/24
11,710,891 B2 * 7/2023 Ryu ......................... H01Q 1/44 343/700 MS (Continued)

FOREIGN PATENT DOCUMENTS

CN 102097675 A 6/2011
CN 102110906 A * 6/2011

(Continued)

OTHER PUBLICATIONS

International Search Report for PCT/KR2020/014366 mailed on Feb. 26, 2021.

(Continued)

*Primary Examiner* — Dameon E Levi
*Assistant Examiner* — Anh N Ho
(74) *Attorney, Agent, or Firm* — The PL Law Group, PLLC

(57) ABSTRACT

An antenna structure according to an embodiment of the present invention includes a dielectric layer, a radiator disposed on the dielectric layer, a first signal pad for supplying a first input signal to the radiator, a second signal pad for selectively supplying a second input signal to the radiator, a first transmission line connecting the first signal pad to the radiator, and a second transmission line connecting the second signal pad to the radiator. Thereby, it is possible to provide an antenna structure having improved signal efficiency and space efficiency by implementing multiple polarization characteristics with one radiator.

15 Claims, 18 Drawing Sheets

(56) References Cited

U.S. PATENT DOCUMENTS

| | | | | |
|---|---|---|---|---|
| 11,824,282 | B2 * | 11/2023 | Lee | H01Q 9/045 |
| 2004/0080455 | A1 | 4/2004 | Lee | |
| 2007/0126641 | A1 | 6/2007 | Saily | |
| 2021/0184333 | A1 * | 6/2021 | Dardenne | H01Q 19/26 |

FOREIGN PATENT DOCUMENTS

| | | | | | |
|---|---|---|---|---|---|
| CN | 202678507 | U | | 1/2013 | |
| CN | 104157978 | A | * | 11/2014 | |
| CN | 109411873 | A | * | 3/2019 | H01Q 1/22 |
| CN | 110197949 | A | | 9/2019 | |
| CN | 213636290 | U | | 7/2021 | |
| JP | 07176942 | A | * | 7/1995 | |
| JP | H07-176942 | A | | 7/1995 | |
| KR | 10-2002-0046238 | A | | 6/2002 | |
| KR | 10-2013-0095451 | A | | 8/2013 | |
| KR | 10-2015-0080421 | A | | 7/2015 | |
| KR | 10-2016-0100857 | A | | 8/2016 | |
| KR | 10-1962822 | B1 | | 3/2019 | |
| KR | 10-1971441 | B1 | | 4/2019 | |
| KR | 10-1973742 | B1 | | 4/2019 | |
| WO | WO 2014/083948 | A1 | | 6/2014 | |

OTHER PUBLICATIONS

Office action issued on Oct. 5, 2020 from Korean Patent Office in a counterpart Korean Patent Application No. 10-2020-0089718 (English translation is also submitted herewith.).

Office action issued on Feb. 3, 2021 from Korean Patent Office in a counterpart Korean Patent Application No. 10-2020-0131656 (English translation is also submitted herewith.).

* cited by examiner

[Port1 On] [Port2 On]

ANTENNA STRUCTURE, ANTENNA ARRAY AND DISPLAY DEVICE INCLUDING THE SAME

CROSS-REFERENCE TO RELATED APPLICATION PRIORITY

The present application is a continuation of application to International Application No. PCT/KR2020/014366 with an International Filing Date of Oct. 21, 2020, which claims the benefit of Korean Patent Application No. 10-2019-0134903 filed on Oct. 28, 2019, Korean Patent Application No. 10-2020-0089718 filed on Jul. 20, 2020 and Korean Patent Application No. 10-2020-0131656 filed on Oct. 13, 2020 at the Korean Intellectual Property Office, the disclosures of which are incorporated by reference herein in their entirety.

BACKGROUND

1. Technical Field

The present invention relates to an antenna structure, an antenna array and a display device including the same, and more particularly, to an antenna structure including an antenna pattern and a dielectric layer, an antenna array and a display device including the antenna structure.

2. Background Art

Recently, according to development of the information-oriented society, wireless communication techniques such as Wi-Fi, Bluetooth, and the like are implemented, for example, in a form of smartphones by combining with display devices. In this case, an antenna may be coupled to the display device to perform a communication function.

Recently, with mobile communication techniques becoming more advanced, it is necessary for an antenna for performing communication in ultra-high frequency bands to be coupled to the display device.

In addition, as the display device on which the antenna is mounted becomes thinner and lighter, a space occupied by the antenna may also be reduced. Accordingly, there is a limit to simultaneously implementing the transmission and reception of high frequency and wideband signals within a limited space.

Therefore, it is necessary to develop an antenna which is inserted into the thin display device in a form of a film or a patch, and secures reliability of radiation characteristics despite the thin structure.

For example, Korean Patent Laid-Open Publication No. 2013-0095451 discloses an antenna integrally formed with a display panel, however, it did not provide an alternative idea to solve the above-described problems.

SUMMARY

An object of the present invention is to provide an antenna structure having improved signal efficiency and space efficiency.

Another object of the present invention is to provide an antenna array and a display device including the antenna structure having the improved signal efficiency and space efficiency.

To achieve the above objects, the following technical solutions are adopted in the present invention.

1. An antenna structure including: a dielectric layer; a radiator disposed on the dielectric layer; a first signal pad configured to supply a first input signal to the radiator; a second signal pad configured to selectively supply a second input signal to the radiator; a first transmission line configured to connect the first signal pad to the radiator; and a second transmission line configured to connect the second signal pad to the radiator.

2. The antenna structure according to the above 1, wherein an angle between an extension direction of the first transmission line and an extension direction of the second transmission line is 80 to 100° (degrees).

3. The antenna structure according to the above 1, wherein the radiator has a regular polygonal shape, and the first transmission line and the second transmission line are respectively connected to two adjacent sides of the regular polygon.

4. The antenna structure according to the above 1, wherein the first transmission line and the second transmission line are formed in parallel to imaginary extension lines which respectively extend from a center of the radiator to two adjacent vertices of the radiator.

5. The antenna structure according to the above 4, wherein the first transmission line and the second transmission line are bent parallel to a long side direction or a short side direction of the radiator.

6. The antenna structure according to the above 1, wherein the radiator includes a mesh structure.

7. The antenna structure according to the above 6, wherein the first transmission line and the second transmission line have a solid structure.

8. The antenna structure according to the above 6, wherein vertices of the radiator, to which the first transmission line and the second transmission line are connected, include impedance matching patterns having a solid structure.

9. The antenna structure according to the above 6, wherein a side of the radiator, to which the first transmission line and the second transmission line are connected, includes an edge pattern defining one edge of the radiator.

10. The antenna structure according to the above 6, wherein the mesh structure includes first unit lines and second unit lines which intersect each other, wherein some of the first unit lines are disposed on the extension line of the first transmission line, and some of the second unit lines are disposed on the extension line of the second transmission line.

11. The antenna structure according to the above 1, wherein lengths of the first transmission line and the second transmission line are the same as each other.

12. The antenna structure according to the above 1, wherein the first signal pad and the first transmission line are symmetrical to the second signal pad and the second transmission line with respect to a center line of the radiator.

13. The antenna structure according to the above 1, further including a driving integrated circuit chip configured to supply the first input signal and the second input signal to the first signal pad and the second signal pad, respectively.

14. The antenna structure according to the above 13, further including a flexible printed circuit board which includes a circuit wiring electrically connected with the first signal pad and the second signal pad, and the driving integrated circuit chip is disposed on the flexible printed circuit board and is electrically connected to the circuit wiring.

15. The antenna structure according to the above 1, wherein the first input signal and the second input signal are independently supplied, wherein one of a vertical polarization and a horizontal polarization is implemented by the first input signal, and the other one of the vertical polarization and the horizontal polarization is implemented by the second input signal.

16. The antenna structure according to the above 1, further including an antenna ground layer disposed on a lower surface of the dielectric layer.

17. A display device including the antenna structure according to the above-described embodiments.

18. An antenna structure including: a first radiator; a second radiator disposed to be spaced apart from the first radiator in a first direction; a third radiator disposed to be spaced apart from the first radiator in a second direction; a first transmission line which extends in the first direction to connect a first signal pad and the first radiator; a second transmission line which extends in the second direction to connect a second signal pad and the first radiator; a third transmission line which extends in the first direction to connect the first radiator and the second radiator; and a fourth transmission line which extends in the second direction to connect the first radiator and the third radiator.

19. An antenna array including a plurality of antenna structures according to the above 18.

20. The antenna array according to the above 19, wherein the plurality of antenna structures are arranged to be spaced apart from each other, or at least partially overlapped with each other.

The antenna structure according to embodiments of the present invention may include the first signal pad and the second signal pad which independently supply an input signal to the radiator. Accordingly, multiple polarization characteristics may be implemented by one radiator.

In some embodiments, the first input signal and the second input signal may be alternately supplied through the first signal pad and the second signal pad, such that a horizontal polarization characteristic and a vertical polarization characteristic may be implemented together through one radiator.

In some embodiments, at least a portion of the antenna pattern layer are formed in a mesh structure, such that transmittance of the antenna structure may be improved. For example, the antenna structure may be applied to various target structures such as a display device, a vehicle, a building, and the like, which include a high frequency or ultra-high frequency (e.g., 3G, 4G, 5G or higher) mobile communication device, thereby improving optical characteristics such as radiation characteristics and transmittance together.

In some embodiments, a plurality of radiators are connected in series in the extension directions of the respective transmission lines, such that an antenna gain may be improved.

DETAILED DESCRIPTION OF THE EMBODIMENTS

Figure 1:
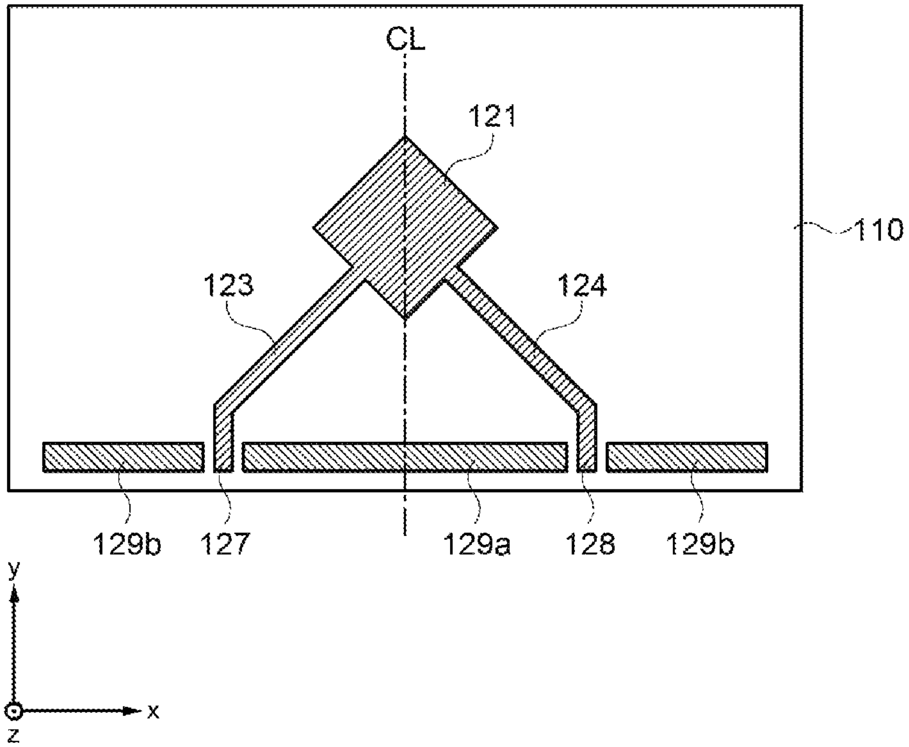
FIGS. 1 to 7 are schematic plan views illustrating antenna pattern layers of antenna structures according to exemplary embodiments.

Exemplary embodiments of the present invention provide an antenna structure which includes: a radiator disposed on a dielectric layer; and a first signal pad and a second signal pad configured to respectively supply a first input signal and a second input signal to the radiator through a first transmission line and a second transmission line. Thereby, it is possible to provide an antenna structure having improved signal efficiency and space efficiency by implementing multiple polarization characteristics with one radiator.

The antenna structure may be, for example, a microstrip patch antenna manufactured in a form of a transparent film. For example, the antenna element may be applied to communication devices for high frequency or ultra-high frequency (e.g., 3G, 4G, 5G or more) mobile communication, Wi-Fi, Bluetooth, near field communication (NFC), global positioning system (GPS) and the like. In addition, the antenna structure may be applied to various target structures such as a vehicle, a building and the like.

In addition, embodiments of the present invention provide a display device including the antenna structure.

Hereinafter, preferred embodiments of the present invention will be described in detail with reference to the accompanying drawings. However, since the drawings attached to the present disclosure are only given for illustrating one of several preferred embodiments of present invention to easily understand the technical spirit of the present invention with the above-described invention, it should not be construed as limited to such a description illustrated in the drawings.

In the following drawings, for example, two directions, which are parallel to an upper surface of a dielectric layer 110 and intersect each other, are defined as an x-direction and a y-direction. For example, the x-direction and the y-direction may intersect each other perpendicularly. A direction perpendicular to the upper surface of the dielectric layer 110 is defined as a z-direction. For example, the x-direction may correspond to a width direction of the antenna structure, the y-direction may correspond to a length direction of the antenna structure, and the z-direction may correspond to a thickness direction of the antenna structure. The definition of the directions may be equally applied to all the remaining drawings.

FIG. 1 is a schematic plan view illustrating an antenna pattern layer of an antenna structure according to exemplary embodiments.

Referring to FIG. 1, the antenna structure may include the dielectric layer 110 and an antenna pattern layer disposed on the dielectric layer 110. The antenna pattern layer may include a radiator 121, and a first signal pad 127 and a second signal pad 128 which are electrically connected to the radiator 121. For example, the radiator 121 may be electrically connected with the first signal pad 127 and the second signal pad 128 through a first transmission line 123 and a second transmission line 124, respectively.

The dielectric layer 110 may include, for example, a transparent resin material. For example, the dielectric layer 110 may include a polyester resin such as polyethylene terephthalate, polyethylene isophthalate, polyethylene naphthalate, polybutylene terephthalate, etc.; a cellulose resin such as diacetyl cellulose, triacetyl cellulose, etc.; a polycarbonate resin; an acrylic resin such as polymethyl (meth) acrylate, polyethyl (meth)acrylate, etc.; a styrene resin such as polystyrene, acrylonitrile-styrene copolymer, etc.; a polyolefin resin such as polyethylene, polypropylene, cyclic polyolefin or polyolefin having a norbornene structure, ethylene-propylene copolymer, etc.; a vinyl chloride resin; an amide resin such as nylon, aromatic polyamide; an imide resin; a polyether sulfonic resin; a sulfonic resin; a polyether ether ketone resin; a polyphenylene sulfide resin; a vinylalcohol resin; a vinylidene chloride resin; a vinylbutyral resin; an allylate resin; a polyoxymethylene resin; a thermoplastic resin such as an epoxy resin and the like. These compounds may be used alone or in combination of two or more thereof.

In addition, a transparent film made of a thermosetting resin or an ultraviolet curable resin such as (meth)acrylate, urethane, acrylic urethane, epoxy, silicone, and the like may be used as the dielectric layer 110. In some embodiments, an adhesive film such as an optically clear adhesive (OCA), an optically clear resin (OCR), and the like may also be included in the dielectric layer 110.

In some embodiments, the dielectric layer 110 may include an inorganic insulation material such as silicon oxide, silicon nitride, silicon oxynitride, glass and the like.

In one embodiment, the dielectric layer 110 may be provided substantially in a single layer. In one embodiment, the dielectric layer 110 may also include a multilayer structure of two or more layers.

Capacitance or inductance may be generated between the antenna pattern layer and/or an antenna ground layer 130 by the dielectric layer 110, thus to adjust a frequency band which can be driven or sensed by the antenna structure. In some embodiments, a dielectric constant of the dielectric layer 110 may be adjusted to a range of about 1.5 to 12. When the dielectric constant exceeds about 12, a driving frequency is excessively reduced, such that driving of the antenna in a desired high frequency band may not be implemented.

As described above, the antenna pattern layer includes the radiator 121, the first signal pad 127, and the second signal pad 128. Herein, the radiator 121 may be electrically connected with the first signal pad 127 and the second signal pad 128 through the first transmission line 123 and the second transmission line 124, respectively.

In exemplary embodiments, the radiator 121, the first signal pad 127, the second signal pad 128, the first transmission line 123, and the second transmission line 124 may be disposed on the upper surface of the dielectric layer 110. The radiator 121, the first signal pad 127, the second signal pad 128, the first transmission line 123 and the second transmission line 124 may be disposed at substantially the same level.

The radiator 121 may receive an input signal (electrical signal) from the first signal pad 127 and the second signal pad 128 to radiate an electromagnetic wave signal. In addition, radiator 121 may receive the electromagnetic wave signal to convert it into an electrical signal based on the reciprocity of the antenna.

In exemplary embodiments, the radiator 121 may be provided as a thin film having a regular polygonal shape. The first transmission line 123 and the second transmission line 124 may be connected to two adjacent sides of the regular polygonal radiator 121 (two adjacent sides of a regular polygon in a plan view). For example, the first transmission line 123 and the second transmission line 124 may be connected to centers of the two sides.

An imaginary line passing through the center of the radiator 121 and bisecting the radiator 121 may be defined as a center line CL. The center line CL may extend in the length direction (the y-direction) of the antenna structure, as shown in FIG. 1.

In exemplary embodiments, the first transmission line 123 may extend in a first direction to be connected to the radiator 121, and the second transmission line 124 may extend in a second direction to be connected to the radiator 121. In this case, the first direction and the second direction have an inclination with respect to the center line CL of the radiator 121, respectively, and an angle between the first direction and the second direction may be 80 to 100°, and preferably 90°.

In exemplary embodiments, the first transmission line 123 and the second transmission line 124 may form an inclination with respect to the length direction (the y-direction) of the antenna structure. For example, when the radiator 121 includes a rhombus shape as shown in FIG. 1, the first transmission line 123 and the second transmission line 124 may extend from the two inclined sides of the radiator 121 in a direction perpendicular thereto. In this case, lengths of the first transmission line 123 and the second transmission line 124 may be reduced, and a transmission speed and efficiency of the input signal may be improved.

In exemplary embodiments, the radiator 121 may include a rhombus shape. The rhombus shape may include a shape in which one side is inclined with respect to the length direction (the y-direction) of the antenna structure. For example, the rhombus shape may be symmetrical based on the center line CL.

In some embodiments, the first transmission line 123 and the second transmission line 124 may be connected to the centers of each side of the radiator 121. For example, the first transmission line 123 and the second transmission line 124 may be branched from the radiator 121 to be connected to the first signal pad 127 and the second signal pad 128, respectively. In one embodiment, the first transmission line 123 and the second transmission line 124 may be branched from the centers of each side of the radiator 121.

In exemplary embodiments, the first transmission line 123 and the second transmission line 124 may be bent. For example, the first transmission line 123 may extend from the first signal pad 127 in the y-direction, and then may be bent in the first direction to be connected to the radiator 121. In addition, the second transmission line 124 may extend from the second signal pad 128 in the y-direction, and then may be bent in the second direction to be connected to the radiator 121.

In exemplary embodiments, the first transmission line 123 and the second transmission line 124 may be formed symmetrically. For example, the symmetry criterion may include the center or the center line CL of the radiator 121.

In one embodiment, the first transmission line 123 and the second transmission line 124 may be substantially integrally connected to the radiator 121 to be provided as a single member. In one embodiment, each of the first transmission line 123 and the second transmission line 124 may be substantially integrally connected to the first signal pad 127 and the second signal pad 128 to be provided as a single member.

Figure 2:
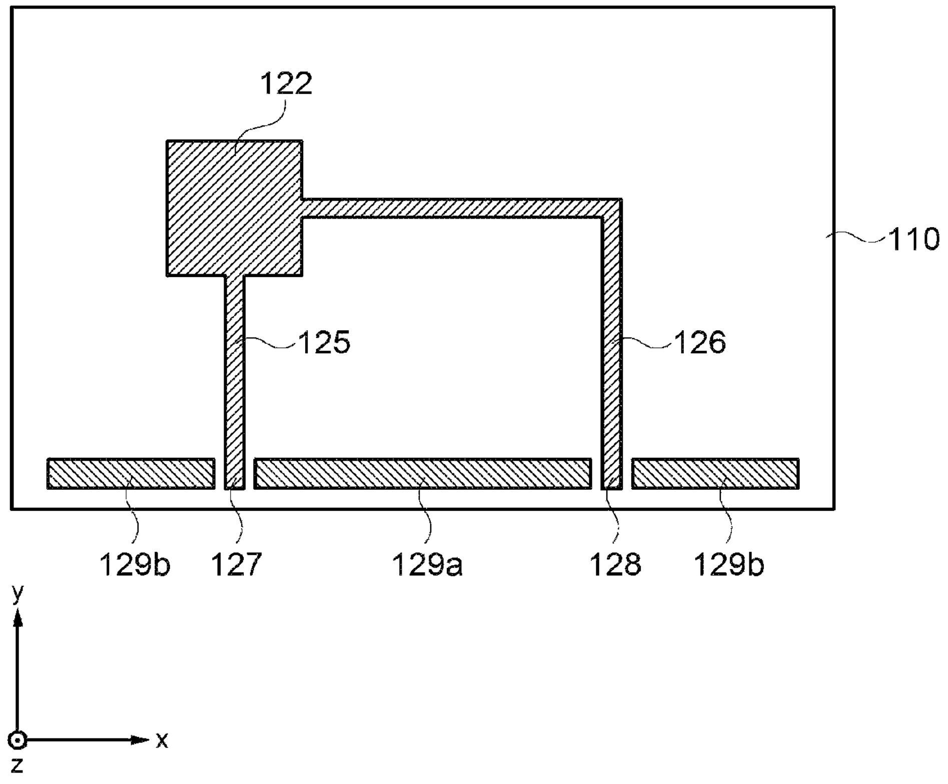

FIG. 2 is a schematic plan view illustrating an antenna pattern layer of an antenna structure according to exemplary embodiments. The substantially same configurations (e.g., configurations having the same reference numerals) as the configurations described with reference to FIG. 1 may not be described in detail.

Referring to FIG. 2, the antenna structure according to exemplary embodiments may include a radiator 122, a first transmission line 125, and a second transmission line 126.

In one embodiment, the radiator 122 may have at least one side arranged parallel to the width direction (the x-direction) of the antenna structure. For example, the radiator 122 may have a square shape, and one side of the square may be arranged parallel to the length direction (the x-direction) of the antenna structure.

In one embodiment, the first transmission line 125 and the second transmission line 126 may be branched from two adjacent sides of the radiator 122. The branched first transmission line 125 may be connected to a first signal pad 127 in a straight line, and the second transmission line 126 may be bent to be connected to the second signal pad 128. In this case, the phase difference between the first input signal and the second input signal supplied to the radiator 122 through the first transmission line 125 and the second transmission line 126 may be adjusted by an IC chip 280.

The first signal pad 127 and the second signal pad 128 may receive power from an external circuit structure and transmit it to the radiator 121.

In exemplary embodiments, the first signal pad 127 may supply a first input signal having a first phase to the radiator 121. The second signal pad 128 may supply a second input signal having a second phase.

In exemplary embodiments, the first input signal and the second input signal may be alternately supplied. In this case, a vertical polarization characteristic and a horizontal polarization characteristic may be implemented through one radiator 121. For example, when the first input signal is supplied, one of the vertical polarization characteristic and the horizontal polarization characteristic may be implemented through the radiator 121, and when the second input signal is supplied, the other one may be implemented.

In some embodiments, the phase of the first input signal may be different from the phase of the second input signal. A second input signal having a phase different from that of the first input signal may be simultaneously supplied to implement circular polarization or elliptical polarization characteristics. The first input signal and the second input signal having the above-described phase difference may be simultaneously supplied to the radiator 121, such that multiple polarization characteristics may be implemented through the radiator 121.

For example, by adjusting the phase difference between the first input signal and the second input signal or by separately supplying the first input signal and the second input signal while switching between each other, multiple polarization characteristics may be implemented through one radiator 121. The polarization characteristic may include horizontal polarization, vertical polarization, right-handed circular polarization, left-handed circular polarization and the like.

In exemplary embodiments, when the first input signal and the second input signal are simultaneously supplied, the phase difference between the first input signal and the second input signal may be about 80 to 100° (degrees). In this case, it is possible to effectively implement the horizontal polarization characteristic, the vertical polarization characteristic, and the circular polarization characteristic together by the antenna structure. Preferably, the phase difference may be 85 to 95°, and more preferably about 90°.

In exemplary embodiments, a polarization axial ratio of the radiator 121 may be 0 to 2. By adjusting the phase difference and the polarization axial ratio, the polarization characteristics of the radiation signal may be controlled. Preferably, the polarization axial ratio is 0.8 to 1.2, and more preferably, the polarization axial ratio is 0.9 to 1.1.

For example, when the phase difference is about 90° and the axial ratio of the radiator is about 1, it is possible to further implement circular polarization (the right-handed circular polarization and the left-handed circular polarization) characteristics by the antenna structure.

Various polarization types of signals may be effectively transmitted and received by implement the plurality of polarization characteristics through one radiator 121. In addition, since a horizontally polarized antenna and a vertically polarized antenna may be integrally formed, space utilization may be improved when mounting the antenna on a display device or the like.

In exemplary embodiments, the radiator 121, the first signal pad 127, the first transmission line 123, the second signal pad 128, and the second transmission line 124 may have a symmetrical structure.

For example, the radiator 121 may have a symmetrical shape with respect to the center line CL. The first signal pad 127 and the second signal pad 128 may be formed symmetrically with respect to the center line CL, and the first transmission line 123 and the second transmission line 124 may also be formed symmetrically with respect to the center line CL.

In exemplary embodiments, the phase difference between the first input signal and the second input signal may be controlled by adjusting lengths of the first transmission line 123 and the second transmission line 124. For example, as shown in FIG. 1, the lengths of the first transmission line 123 and the second transmission line 124 may be adjusted to be substantially the same as each other, and as shown in FIG. 2, the lengths of the first transmission line 125 and the second transmission line 126 may be adjusted to be different from each other.

For example, when the lengths of the first transmission line 123 and the second transmission line 124 are substantially the same as each other, and if input signals having a predetermined phase difference are supplied from the driving integrated circuit chip to the first signal pad 127 and the second signal pad 128, the predetermined phase difference may be supplied to the radiator 121 without substantial change. In this case, the phase difference between the first input signal and the second input signal may be easily adjusted. For example, the phase difference between input signals supplied from the driving integrated circuit chip may be transmitted to the radiator 121 as it is.

For example, when the first transmission line 125 and the second transmission line 126 have a length difference, even if a signal having the same phase is supplied to the first signal pad 127 and the second signal pad 128, a phase difference between the input signals supplied to the radiator 122 through the first transmission line 125 and the second transmission line 126 may occur due to the length difference.

The antenna pattern layer may further include a ground pad 129. The ground pad 129 may be disposed to be electrically and physically spaced apart from the first signal pad 127 and the second signal pad 128 around the first signal pad 127 and the second signal pad 128. For example, a pair of ground pads 129 may be disposed to face each other in the second direction with the first signal pad 127 and the second signal pad 128 interposed therebetween.

In exemplary embodiments, the ground pad 129 may include a first ground pad 129*a* disposed between the first signal pad 127 and the second signal pad 128.

In exemplary embodiments, the ground pad 129 may include second ground pads 129*b* disposed to face the first ground pad 129*a* with the first signal pad 127 and the second signal pad 128 interposed therebetween.

The ground pad 129 may be disposed on the same layer or at the same level (e.g., on the upper surface of the dielectric layer 110) as the antenna pattern layer. In this case, the horizontal radiation characteristic may be implemented through the antenna structure. As will be described below with reference to FIG. 15, the antenna structure may further include the antenna ground layer 130 on a lower surface of the dielectric layer 110. In this case, the vertical radiation characteristic may be implemented through the antenna structure.

In some embodiments, the ground pad 129 may be omitted in consideration of a beam width of the antenna signal.

The antenna pattern layer may include low resistance metal such as silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca), or an alloy including at least one thereof. These may be used alone or in combination of two or more thereof. For example, silver (Ag) or a silver alloy (e.g., a silver-palladium-copper (APC) alloy) may be used to implement a low resistance.

In one embodiment, the antenna pattern layer may include copper (Cu) or a copper alloy (e.g., a copper-calcium (CuCa) alloy) in consideration of low resistance and fine line width patterning.

In some embodiments, the antenna pattern layer may include a transparent conductive oxide such as indium tin oxide (ITO), indium zinc oxide (IZO), indium zinc tin oxide (IZTO), or zinc oxide (ZnOx).

In some embodiments, the antenna pattern layer may include a lamination structure of a transparent conductive oxide layer and a metal layer, for example, may have a three-layer structure of a transparent conductive oxide layer-metal layer-transparent conductive oxide layer. In this case, resistance may be reduced to improve signal transmission speed while improving flexible properties by the metal layer, and corrosion resistance and transparency may be improved by the transparent conductive oxide layer.

Figure 3:
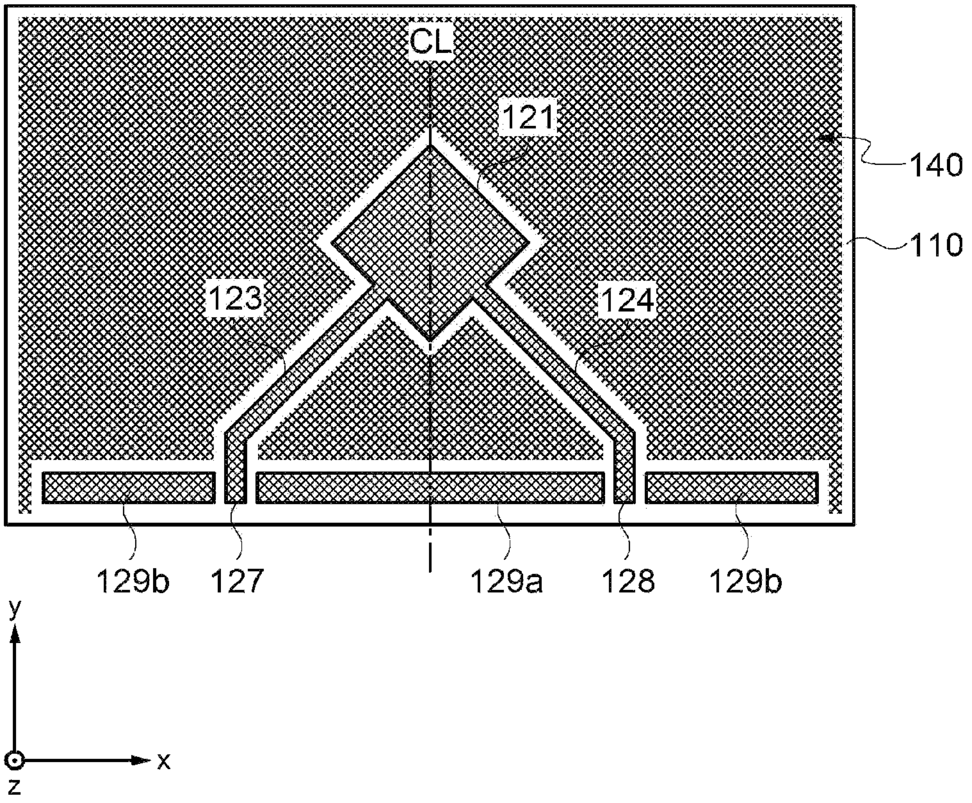

FIG. 3 is a schematic plan view illustrating an antenna pattern layer of an antenna structure according to exemplary embodiments.

Referring to FIG. 3, the radiator 121 may include a mesh structure. In this case, transmittance of the radiator 121 may be improved, and when mounting the antenna structure on the display device, it is possible to suppress the radiator 121 from being viewed by a user. In one embodiment, the first transmission line 123 and the second transmission line 124 may also be patterned together with the radiator 121 to include a mesh structure.

In exemplary embodiments, when the radiator 121 includes the mesh structure, a dummy mesh pattern 140 may be disposed around the radiator 121. As described with reference to FIG. 3, the transmittance of the antenna structure may be improved as the radiator 121 includes the mesh structure.

As the dummy mesh pattern 140 is disposed around the radiator 121, it allows the pattern arrangement around the radiator 121 to be uniform, thus to prevent the mesh structure or the conductive line included therein from being viewed by a user of the display device.

For example, a mesh metal layer may be formed on the dielectric layer 110, and the mesh metal layer may be cut along a predetermined separation region to electrically and physically separate the dummy mesh pattern 140 from the radiator 121, the first transmission line 123, the second transmission line 124 and the like. In this case, as shown in FIG. 3, the radiator 121, the first transmission line 123 and the second transmission line 124 may be divided from the dummy mesh pattern 140 by forming an edge or an edge pattern around the same, or may be divided from the dummy mesh pattern 140 only by separating from the dummy mesh pattern 140 without the edge or the edge pattern.

Similarly, when the first transmission line 123 and the second transmission line 124 include a mesh structure, the dummy mesh pattern 140 may also extend around the first transmission line 123 and the second transmission line 124. In one embodiment, the first signal pad 127, the second signal pad 128 and/or the ground pad 129 may also include a mesh structure. In this case, the dummy mesh pattern 140 may also extend around the first signal pad 127, the second signal pad 128 and/or the ground pad 129.

In some embodiments, the first signal pad 127 and the second signal pad 128 may have a solid structure. In one embodiment, the ground pad 129 may also have a hollow structure for improving noise absorption efficiency.

FIGS. 4 to 7 are schematic plan views illustrating antenna pattern layers of antenna structures according to exemplary embodiments. Details of the contents substantially the same as those of the structures and configurations described with reference to FIGS. 1 to 3 will not be described.

Figure 4:
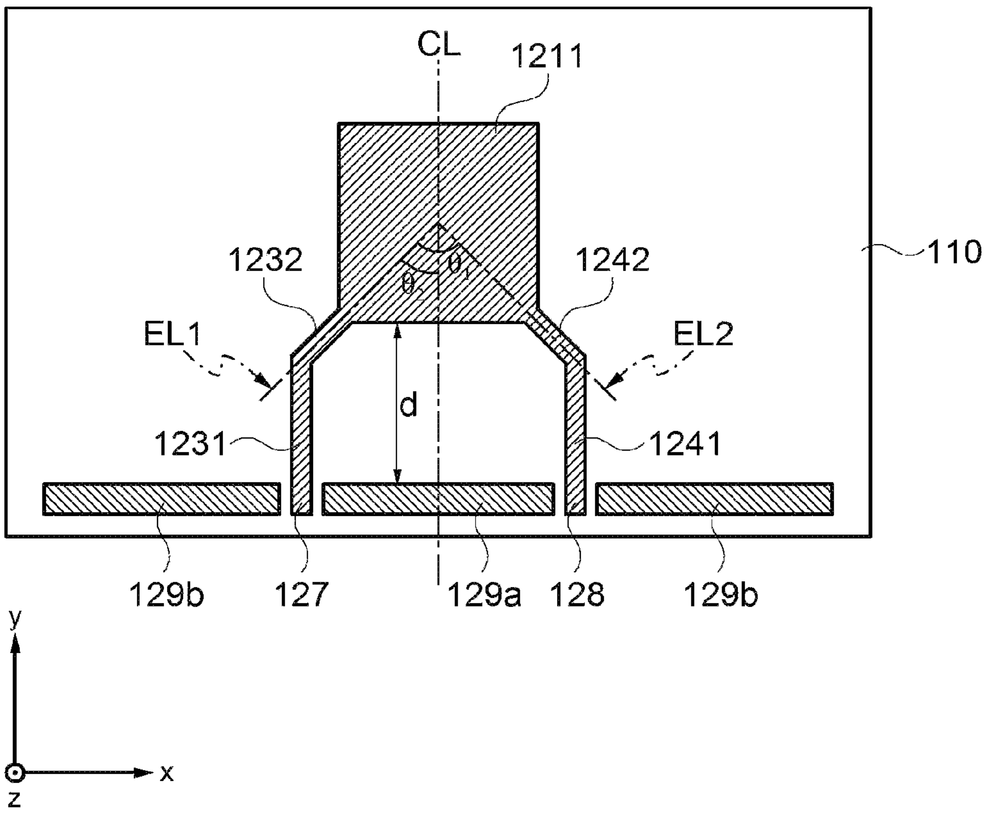

Referring to FIG. 4, a first transmission line 1232 and a second transmission line 1242 may be formed by extending in the first direction and the second direction, respectively. The first direction and the second direction may be parallel to imaginary extension lines EL1 and EL2 which respectively extend from the center of the radiator 1211 toward two vertices adjacent to each other.

For example, the radiator 1211 may have a quadrangular (e.g., rectangular or square) shape with one side parallel to the y-direction. The quadrangle may include a first vertex and a second vertex adjacent to the first vertex.

The first transmission line 1232 may extend from the first vertex along a first imaginary line EL1 connecting the first vertex and the center of the radiator 1211. The second transmission line 1242 may extend from the second vertex along a second imaginary line EL2 connecting the second vertex and the center of the radiator 1211.

In this case, dual polarization characteristics of the antenna may be effectively implemented through the first transmission line 1232 and the second transmission line 1242.

In exemplary embodiments, an angle θ1 between an extension direction (the first direction) of the first transmission line 1232 and an extension direction (the second direction) of the second transmission line 1242 may be 80 to 100°. In this case, multiple polarization characteristics may be effectively implemented.

For example, the radiator 1211 may have a substantially square shape. An angle θ2 between the extension direction of the first transmission line 1232 or the first imaginary line EL1 and the center line CL of the radiator 1211 may be 40 to 50°, and preferably about 45°.

Preferably, the extension direction of the first transmission line 1232 and the extension direction of the second transmission line 1242 may be substantially orthogonal to each other.

In some embodiments, a distance d between each of the ground pads 129*a* and 129*b* and the radiator 1211 may be about 1 to 2,000 μm.

In some embodiments, each of the first transmission line 1232 and the second transmission line 1242 may include parallel portions 1231 and 1241 which extend by being bent in a direction parallel to a long side direction or a short side direction of the radiator 1211. For example, the parallel portions 1231 and 1241 may be formed parallel to the y-direction.

Figure 5:
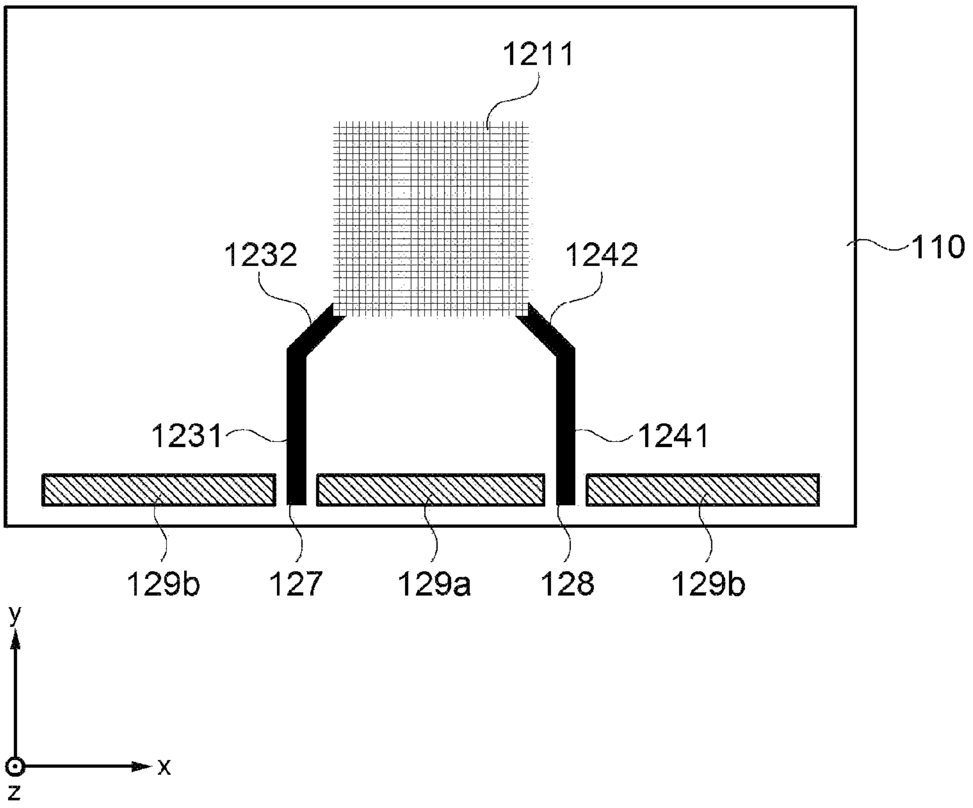

Referring to FIG. 5, a radiator 1211 may have a mesh structure, and a first transmission line 1232 and a second transmission line 1242 may have a solid structure. In this case, the gain of the antenna may be improved due to a decrease in the resistance of the transmission line.

Figure 6:
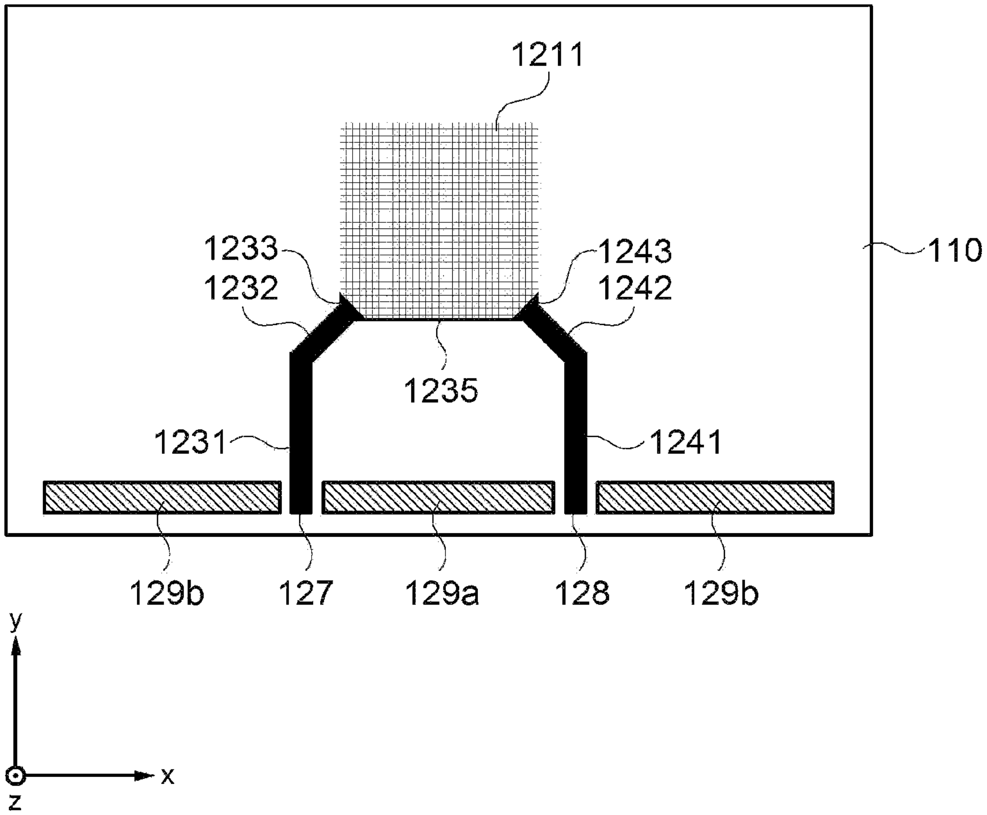

Referring to FIG. 6, impedance matching patterns 1233 and 1243 may be formed at the first vertex and the second vertex, to which the radiator 1211 and the first transmission line 1232 and the second transmission line 1242 are respectively connected. The impedance matching patterns 1233 and 1243 may have a solid structure. In this case, gain/radiation characteristics of the antenna may be improved.

In some embodiments, the impedance matching patterns 1233 and 1243 may be made of metal or an alloy as used to prepare the radiator 1211, and preferably, are made of the same material as the radiator 1211 and the transmission lines 1232 and 1242.

In exemplary embodiments, one side of the radiator 1211, which is disposed between the first transmission line 1232 and the second transmission line 1242, may be formed as an edge pattern 1235. The edge pattern 1235 is one side of the radiator 1211 and may define a boundary between the radiator 1211 and an outside thereof.

The edge pattern 1235 may be made of metal or an alloy as used to prepare the radiator 1211, and preferably, are made of the same material as the radiator 1211 and the transmission lines 1232 and 1242.

Contact areas between the radiator 1211 and the impedance matching patterns 1233 and 1243 may be increased by the edge pattern 1235. Accordingly, power supplying/signaling efficiencies by the impedance matching patterns 1233 and 1243 may be improved, and gain characteristics through the radiator 1211 may also be improved.

As described above, the radiator 1211 may have the mesh structure, and the mesh structure may include a plurality of unit cells formed by conductive lines intersecting each other. In some embodiments, the edge pattern 1235 may continuously connect vertices of unit cells arranged on one side or one edge of the radiator 1211, which are adjacent to the impedance matching patterns 1233 and 1243.

In exemplary embodiments, the impedance matching patterns 1233 and 1243 and the edge pattern 1235 may be disposed in a region where an image is not displayed (e.g., a peripheral region 320) when mounting the antenna structure on a display device 300.

Figure 7:
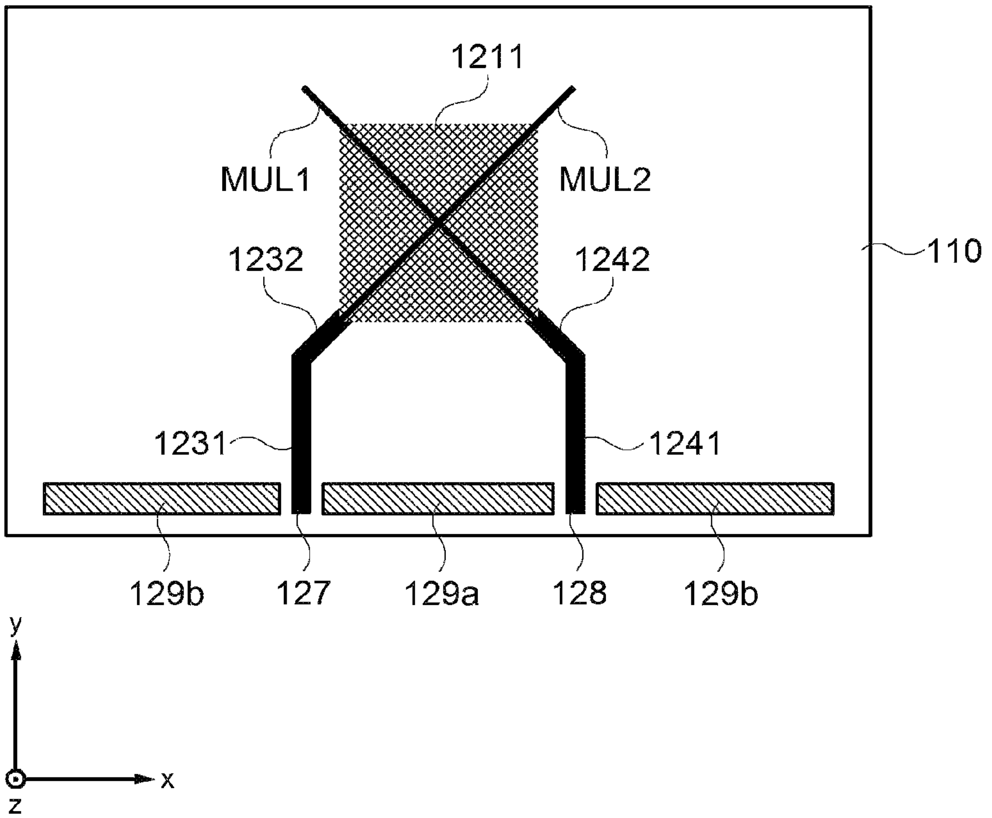

Referring to FIG. 7, the mesh structure of a radiator 1211 may include unit mesh lines. The unit mesh lines may include first unit mesh lines and second unit mesh lines intersecting each other.

In exemplary embodiments, the first unit mesh line and the second unit mesh line may intersect at an angle of about 90°.

In exemplary embodiments, the first unit mesh line may be formed parallel to the extension direction of a first transmission line 1232, and the second unit mesh line may be formed parallel to the extension direction of a second transmission line 1242.

In exemplary embodiments, a portion MUL1 of the first unit mesh line may be disposed on an extension line of the first transmission line 1232, and a portion MUL2 of the second unit mesh line may be disposed on an extension line of the second transmission line 1242. In this case, the transmission lines 1232 and 1242 and the unit mesh lines are connected in a straight line, such that the gain characteristics of the antenna may be improved, and the vertical polarization and the horizontal polarization may be separately driven in a more reliable manner.

Figure 8:
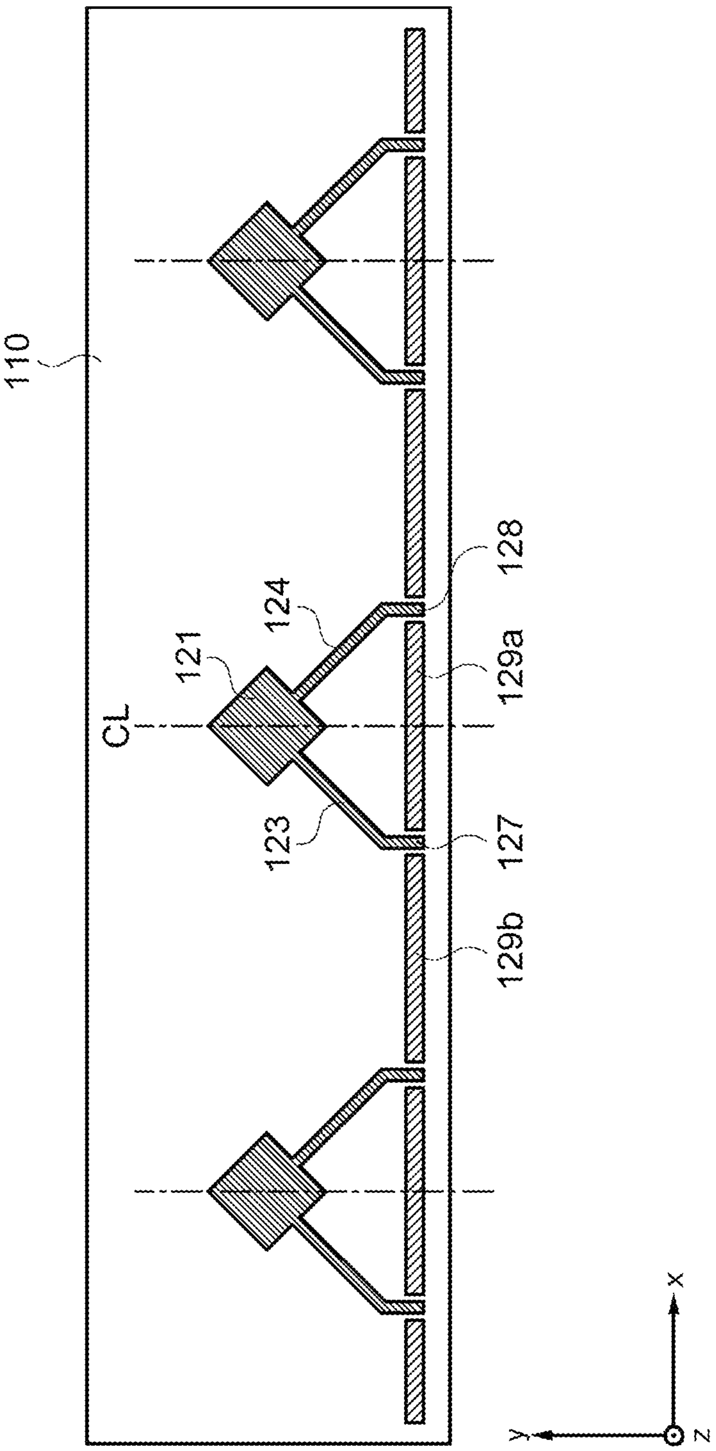
FIG. 8 is a schematic plan view illustrating an antenna array in which a plurality of radiators are arranged according to exemplary embodiments.

FIG. 8 is a schematic plan view illustrating an antenna array in which a plurality of radiators are arranged according to exemplary embodiments.

Referring to FIG. 8, the antenna array may include a plurality of radiators 121. For example, the plurality of radiators 121 may be disposed at the same level on the dielectric layer 110.

An antenna array may be formed by the arrangement of the plurality of radiators 121.

Accordingly, directivity of the radiation signal may be improved. For example, a distance between center lines CL of adjacent radiators 121 of the plurality of radiators 121 may be λ/2 or more.

The antenna array may transmit and receive frequencies of about 20 GHz band and about 30 to 40 GHz band. For example, the radiator 121 may include a radiator for a band of about 20 GHz and a radiator for a band of about 30 to 40 GHz. The two radiators may be disposed together on the dielectric layer 110.

Figure 9:
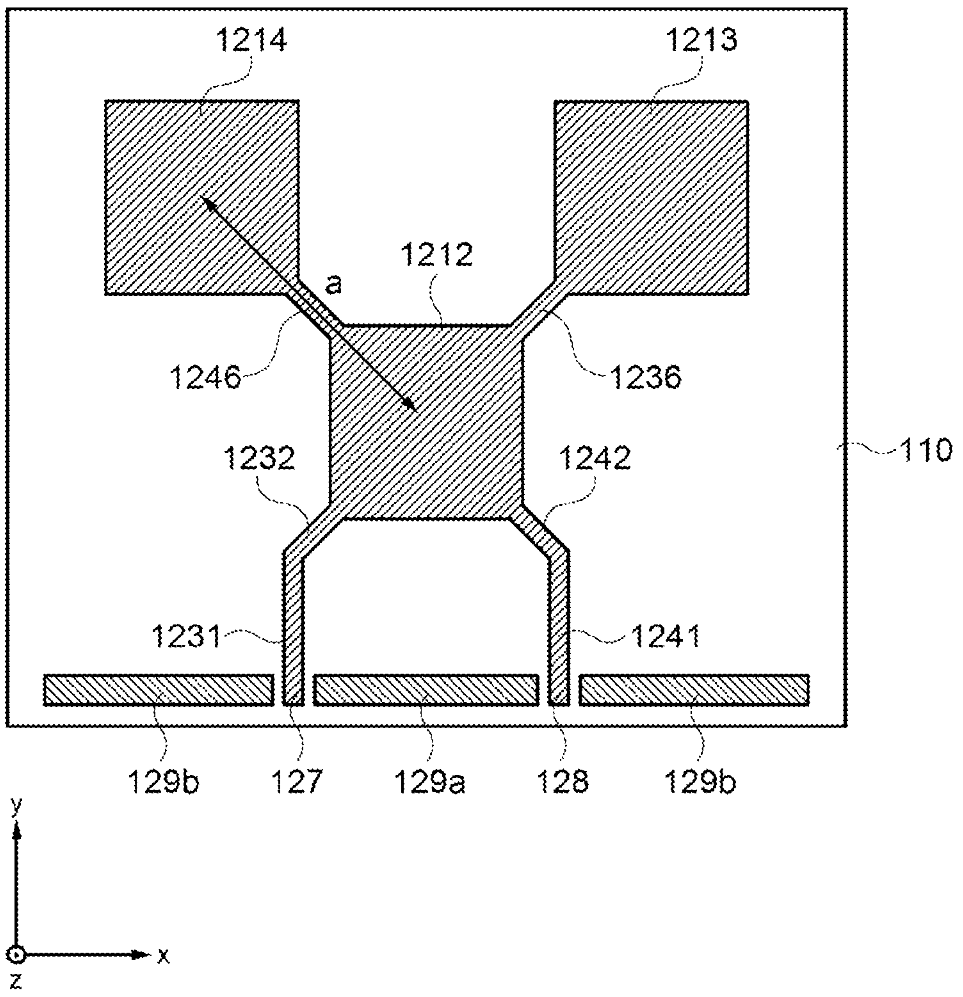
FIGS. 9 and 10 are schematic plan views illustrating antenna pattern layers of antenna structures according to exemplary embodiments.
Figure 10:
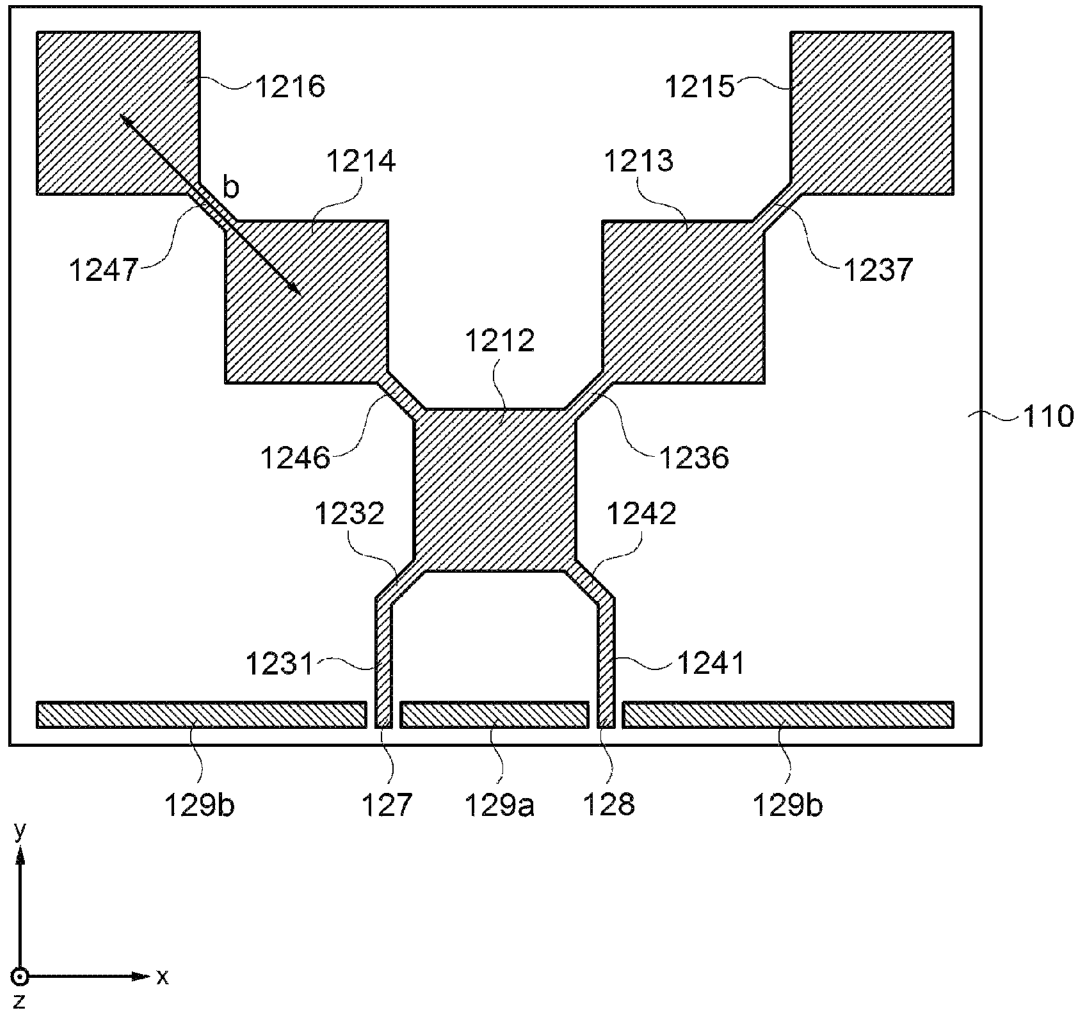

FIGS. 9 and 10 are schematic plan views illustrating antenna pattern layers of antenna structures according to exemplary embodiments. Details of the contents substantially the same as those of the structures and configurations described with reference to FIGS. 1 to 8 will not be described.

Referring to FIG. 9, the antenna pattern layer may include a first radiator 1212, a second radiator 1213, and a third radiator 1214.

In exemplary embodiments, the first radiator 1212, the second radiator 1213 and the third radiator 1214 may have a rectangular or square shape.

In exemplary embodiments, the length and/or width of the first radiator 1212, the second radiator 1213 and the third radiator 1214 may be the same as or different from each other.

The second radiator 1213 may be disposed to be spaced apart from the first radiator 1212 by a predetermined interval in the first direction, and may be connected with the first radiator 1212 through a third transmission line 1236 extending in the first direction. In this case, the third transmission line 1236 may connect two opposing vertices of the first radiator 1212 and the second radiator 1213 with each other. Through this, the first transmission line 1232 extending in the first direction to be connected to the first radiator 1212, the first radiator 1212, the third transmission line 1236 extending from the first radiator 1212 in the first direction to be connected to the second radiator 1213, and the second radiator 1213 may form one serial power supply antenna.

In addition, the third radiator 1214 may be disposed to be spaced apart from the first radiator 1212 by a predetermined interval in the second direction, and may be connected with the first radiator 1212 through a fourth transmission line 1246 extending in the second direction. In this case, the fourth transmission line 1246 may connect two opposing vertices of the first radiator 1212 and the third radiator 1214 with each other. Through this, the second transmission line 1242 extending in the second direction to be connected to the first radiator 1212, the first radiator 1212, the fourth transmission line 1246 extending from the first radiator 1212 in the second direction to be connected to the third radiator 1214, and the third radiator 1214 may form another serial power supply antenna.

According to an embodiment, a distance a between the center of the first radiator 1212 and the center of the second radiator 1213, and between the center of the first radiator 1212 and the center of the third radiator 1214 may be λ/2 or more.

The antenna structure according to exemplary embodiments may improve the antenna gain by connecting a plurality of radiators in series in the extension direction of each transmission line.

Referring to FIG. 10, the antenna pattern layer may further include a fourth radiator 1215 and a fifth radiator 1216.

In exemplary embodiments, the length and/or width of the fourth radiator 1215 and the fifth radiator 1216 may be the same as or different from the length and/or width of the first radiator 1212, the second radiator 1213 or the third radiator 1214.

The fourth radiator 1215 may be disposed to be spaced apart from the second radiator 1213 by a predetermined interval in the first direction, and may be connected with the second radiator 1213 through a fifth transmission line 1237 extending in the first direction. In this case, the fifth transmission line 1237 may connect two opposing vertices of the second radiator 1213 and the fourth radiator 1215 with each other. Through this, the first transmission line 1232, the first radiator 1212, the third transmission line 1236, the second radiator 1213, the fifth transmission line 1237, and the fourth radiator 1215 may form one serial power supply antenna.

In addition, the fifth radiator 1216 may be disposed to be spaced apart from the third radiator 1214 by a predetermined interval in the second direction, and may be connected with the third radiator 1214 through a sixth transmission line 1247 extending in the second direction. In this case, the sixth transmission line 1247 may connect two opposing vertices of the third radiator 1214 and the fifth radiator 1216 with each other. Through this, the second transmission line 1242, the first radiator 1212, the fourth transmission line 1246, the third radiator 1214, the sixth transmission line 1247, and the fifth radiator 1216 may form another serial power supply antenna.

According to an embodiment, a distance b between the center of the second radiator 1213 and the center of the fourth radiator 1215, and between the center of the third radiator 1214 and the center of the fifth radiator 1216 may be 212 or more.

The radiators 1212, 1213, 1214, 1215 and 1216, and/or the transmission lines 1232, 1236, 1237, 1242, 1246 and 1247 of FIGS. 9 and 10 may have a solid structure or a mesh structure.

In addition, the antenna structures of FIGS. 9 and 10 may include the impedance matching patterns 1233 and 1243 and the edge pattern 1235 described above with reference to FIG. 6.

On the other hand, FIGS. 9 and 10 show an example including three or five radiators, but these are only exemplary embodiments, and the number of radiators is not particularly limited.

Figure 11:
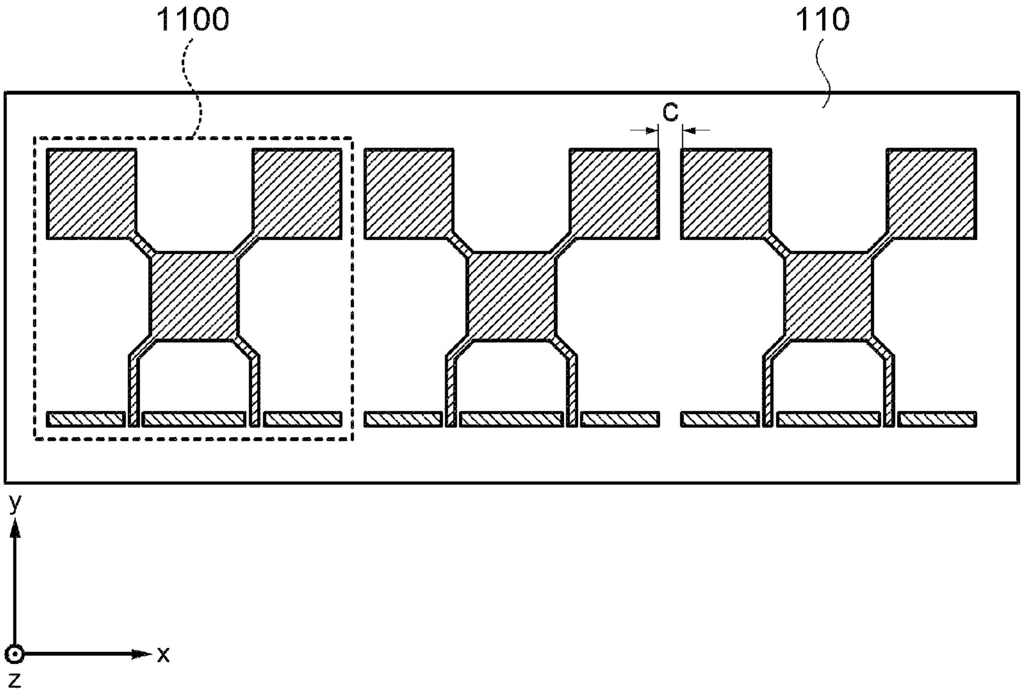
FIGS. 11 to 13 are schematic plan views illustrating antenna arrays in which a plurality of antenna structures are arranged according to exemplary embodiments.
Figure 12:
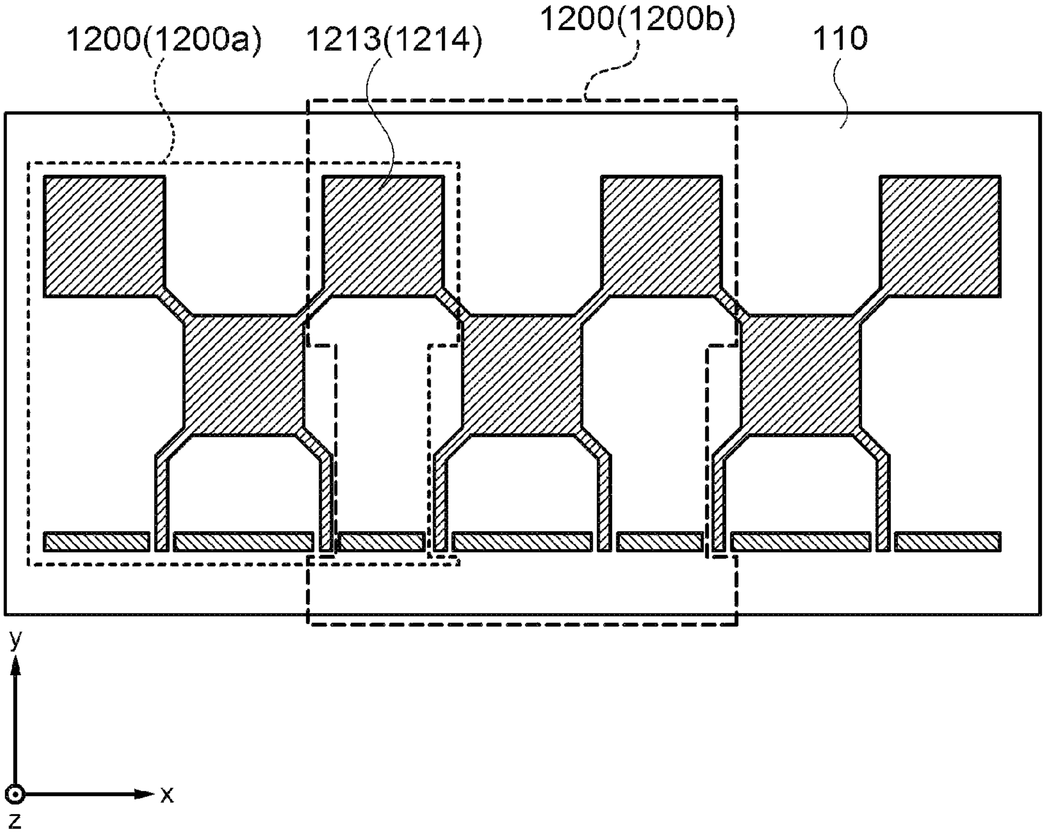
Figure 13:
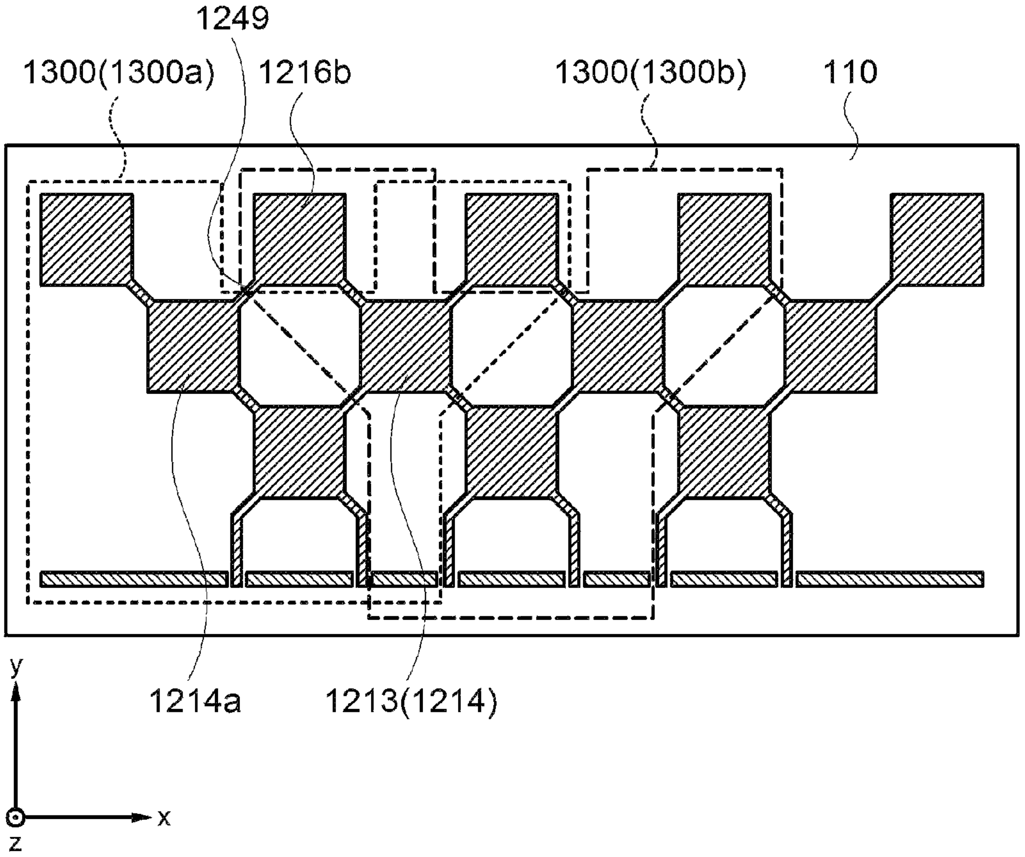

FIGS. 11 to 13 are schematic plan views illustrating antenna arrays in which a plurality of antenna structures are arranged according to exemplary embodiments. Details of the contents substantially the same as those of the structures and configurations described with reference to FIGS. 1 to 10 will not be described.

Referring to FIG. 11, the antenna array may include a plurality of antenna structures 1100 which are disposed with being spaced apart from each other in the x-direction. Herein, the antenna structure 1100 may be the antenna structures shown in FIGS. 9 and 10. For example, the plurality of antenna structures 1100 may be disposed at the same level on the dielectric layer 110.

According to an embodiment, a distance c between the antenna structures 1100 may be 0.5 mm or more.

Referring to FIG. 12, the antenna array may include a plurality of antenna structures 1200 at least partially overlapped with each other in the x-direction. Herein, the antenna structure 1200 may be the antenna structure of FIG. 9. For example, the plurality of antenna structures 1200 may be disposed at the same level on the dielectric layer 110.

The adjacent antenna structures 1200*a* and 1200*b* may share at least one radiator(s) 1213 and 1214 with each other.

Referring to FIG. 13, the antenna array may include a plurality of antenna structures 1300 at least partially overlapped with each other in the x-direction. Herein, the antenna structure 1300 may be the antenna structure shown in FIG. 10. For example, the plurality of antenna structures 1300 may be disposed at the same level on the dielectric layer 110.

The adjacent antenna structures 1300*a* and 1300*b* may share at least one radiator(s) 1213 and 1214 with each other.

In addition, a third radiator 1214*a* of the antenna structure 1300*a* may be connected with a fifth radiator 1216*b* of the adjacent antenna structure 1300*b* through a transmission line 1249.

In the antenna array according to exemplary embodiments, the plurality of antenna structures are arranged with being spaced apart from each other or are arranged with being at least partially overlapped with each other, such that the antenna gain may be improved.

Figure 14:
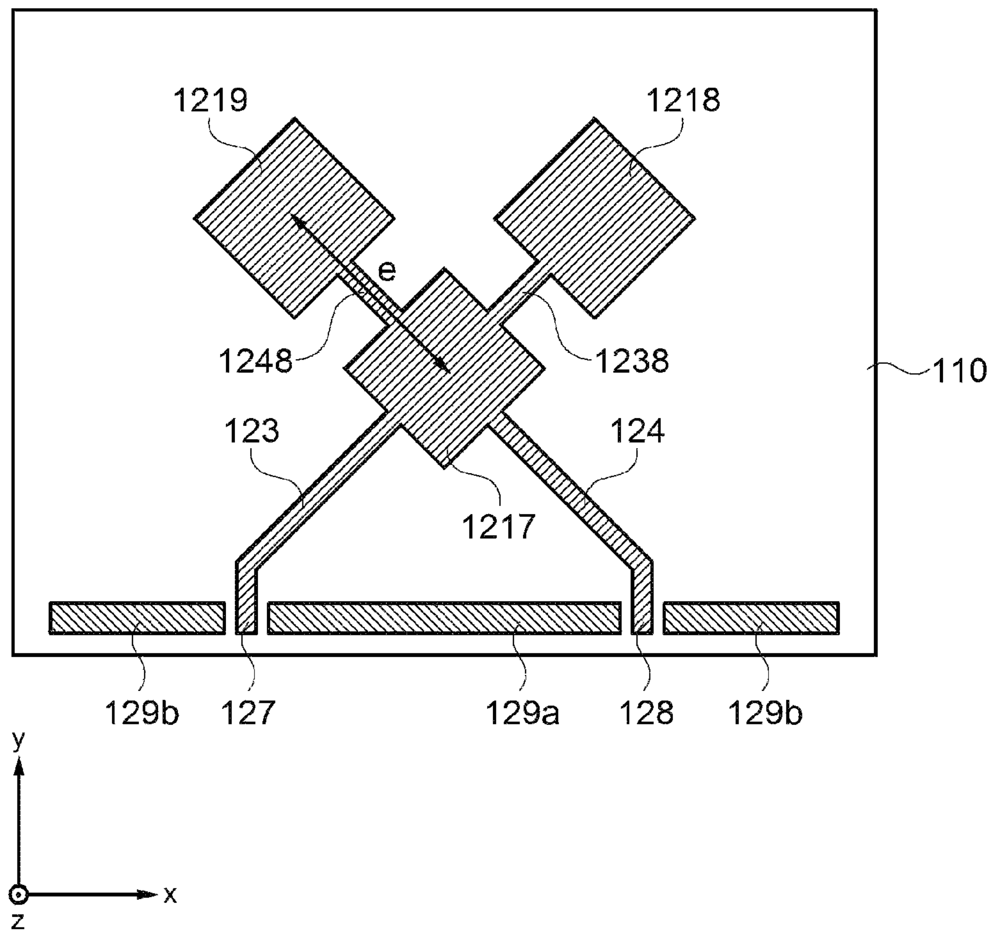
FIG. 14 is a schematic cross-sectional view illustrating an antenna structure according to exemplary embodiments.

FIG. 14 is a schematic cross-sectional view illustrating an antenna structure according to exemplary embodiments. Details of the contents substantially the same as those of the structures and configurations described with reference to FIGS. 1 to 13 will not be described.

Referring to FIG. 14, the antenna pattern layer may include a first radiator 1217, a second radiator 1218 and a third radiator 1219.

In exemplary embodiments, the first radiator 1217, the second radiator 1218 and the third radiator 1219 may have a rhombus shape.

In exemplary embodiments, the length and/or width of the first radiator 1217, the second radiator 1218 and the third radiator 1219 may be the same as or different from each other.

The second radiator 1218 may be disposed to be spaced apart from the first radiator 1217 by a predetermined interval in the first direction, and may be connected with the first radiator 1217 through a third transmission line 1238 extending in the first direction. In this case, the third transmission line 1238 may connect two opposing sides of the first radiator 1217 and the second radiator 1218 with each other. Through this, the first transmission line 123, the first radiator 1217, the third transmission line 1238, and the second radiator 1218 may form one serial power supply antenna.

In addition, the third radiator 1219 may be disposed to be spaced apart from the first radiator 1217 by a predetermined interval in the second direction, and may be connected with the first radiator 1217 through a fourth transmission line 1248 extending in the second direction. In this case, the fourth transmission line 1248 may connect two opposing sides of the first radiator 1217 and the third radiator 1219 with each other. Through this, the second transmission line 124, the first radiator 1217, the fourth transmission line 1248 and the third radiator 1219 may form another serial power supply antenna.

According to an embodiment, a distance e between the center of the first radiator 1217 and the center of the second radiator 1218, and between the center of the first radiator 1217 and the center of the third radiator 1219 may be $\lambda/2$ or more.

According to one embodiment, the antenna structure may further include a fourth radiator and a fifth radiator similar to FIG. 10. In addition, a plurality of antenna structures may be arranged similar to FIGS. 11, 12 and 13 to form an antenna array.

Figure 15:
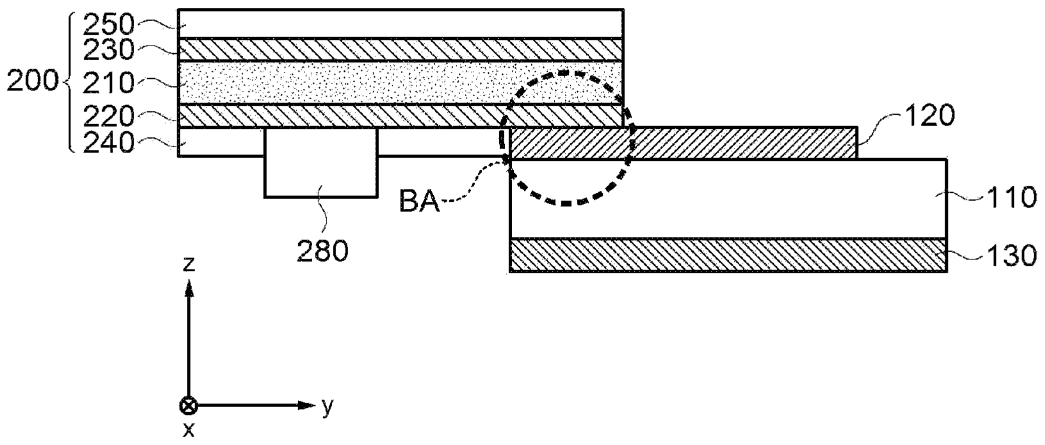
FIG. 15 is a schematic cross-sectional view illustrating an antenna structure according to exemplary embodiments.

FIG. 15 is a schematic cross-sectional view illustrating an antenna structure according to exemplary embodiments.

Referring to FIG. 15, the antenna structure may further include a flexible printed circuit board (FPCB) 200. The antenna structure may further include a driving integrated circuit (IC) chip 280 electrically connected thereto through the flexible printed circuit board 200.

An antenna pattern layer 120 may be disposed on the upper surface of the dielectric layer 110. The antenna pattern layer 120 includes the radiator 121, the first transmission line 123, the second transmission line 124, the first signal pad 127, and the second signal pad 128 which are described with reference to FIG. 1, and may further include a ground pad 129 disposed around the first signal pad 127 and the second signal pad 128.

In some embodiments, the antenna ground layer 130 may be formed on the lower surface of the dielectric layer 110. The antenna ground layer 130 may be disposed to be entirely overlapped with the antenna pattern layer 120 in a planar direction.

In one embodiment, a conductive member of the display device or a display panel on which the antenna structure is mounted may be provided as the antenna ground layer 130. For example, the conductive member may include electrodes or wirings such as a gate electrode, source/drain electrodes, pixel electrode, common electrode, data line, scan line, etc. of a thin film transistor (TFT) included in the display panel.

In one embodiment, for example, various structures including a conductive material disposed under the display panel may be provided as the ground layer. For example, a metal plate (such as a stainless steel (SUS) plate), a pressure sensor, a fingerprint sensor, an electromagnetic wave shielding layer, a heat radiation sheet, a digitizer, etc. may be provided as the ground layer.

The antenna structure may be adhered or bonded to an external circuit structure in a bonding area BA. The external circuit structure may include the flexible printed circuit board (FPCB) 200 and a conductive relay structure.

The flexible printed circuit board 200 may be disposed on the antenna pattern layer 120. The flexible printed circuit board 200 may include a core layer 210, a circuit wiring 220, and a power supply ground 230. An upper coverlay film 250 and a lower coverlay film 240 for protecting wiring may be respectively formed on upper and lower surfaces of the core layer 210.

The core layer 210 may include a resin material having flexibility, such as polyimide, epoxy resin, polyester, cyclo olefin polymer (COP), liquid crystal polymer (LCP) and the like.

The circuit wiring 220 may be disposed on, for example, one surface (e.g., the lower surface) of the core layer 210. The circuit wiring 220 may be provided as a wiring for distributing power from the driving integrated circuit (IC) chip 280 to the antenna pattern layer 120 or the radiator 121.

According to exemplary embodiments, the circuit wiring 220 may be electrically connected to the first signal pad 127 and the second signal pad 128 of the antenna pattern layer 120. For example, the circuit wiring 220 and the signal pads 127 and 128 may be electrically connected with each other through the conductive relay structure interposed therebetween.

In exemplary embodiments, the circuit wiring 220 may include a first circuit wiring and a second circuit wiring. The first circuit wiring may electrically connect the driving integrated circuit chip 280 and the first signal pad 127. The second circuit wiring may electrically connect the driving integrated circuit chip 280 and the second signal pad 128. By adjusting the lengths of the first circuit wiring and the second circuit wiring, the phase difference between the input signals supplied to the radiators 121 and 122 may be controlled. For example, the first circuit wiring may be formed in a straight line, and the second circuit wiring may be formed so as to have one or more bent portions to make a length difference.

The conductive relay structure may be made of, for example, an anisotropic conductive film (ACF). In this case, the conductive relay structure may include conductive particles (e.g., silver particles, copper particles, carbon particles, or the like) dispersed in the resin layer.

For example, the lower coverlay film 240 may be partially cut or removed to expose a portion of the circuit wiring 220 to be bonded to the antenna pattern layer 120 in the bonding area BA. The exposed circuit wiring 220 portion and the antenna pattern layer 120 may be press bonded through the conductive relay structure.

The power supply ground 230 may be disposed on the upper surface of the core layer 210. The power supply ground 230 may have a line shape or a plate shape. The power supply ground 230 may function as a barrier for shielding or suppressing noise or self-radiation generated from the circuit wiring 220.

The circuit wiring 220 and the power supply ground 230 may include the metal and/or alloy described in the antenna pattern layer 120.

In some embodiments, the power supply ground 230 may be electrically connected to the ground pad 129 (see FIG. 1) of the antenna pattern layer 120 through a ground via or a ground contact (not illustrated) which penetrates the core layer 210.

The driving IC chip 280 may be disposed on the flexible printed circuit board 200. Power may be supplied from the driving IC chip 280 to the antenna pattern layer 120 through the circuit wiring 220. For example, the flexible printed circuit board 200 may further include a circuit or contact for electrically connecting the driving IC chip 280 and the circuit wiring 220 with each other.

The driving IC chip 280 may supply input signals having different phases to the first signal pad 127 and the second signal pad 128 through the circuit wiring 220. The driving IC chip 280 may control the phases of the first input signal and the second input signal. Accordingly, multiple polarization characteristics may be implemented through the radiator 121.

In exemplary embodiments, the driving IC chip 280 may control a time of supplying the first input signal and the second input signal. For example, the driving IC chip 280 may alternately supply the first input signal and the second input signal in turn.

In some embodiments, the driving IC chip 280 may form a phase difference between the first input signal and the second input signal. In addition, the phases of the first input signal and the second input signal may be controlled while the phase difference between the first input signal and the second input signal is substantially fixed. Through this, beam-steering is available, such that the directing direction of the antenna may be controlled.

On the other hand, FIG. 15 shows an example in which the driving IC chip 280 is mounted on the flexible printed circuit board 200, but this is only an embodiment. That is, the driving IC chip 280 may be mounted on other circuit board connected to the flexible printed circuit board 200. In this case, the other circuit board may be a circuit board of the display device or display panel on which the antenna structure is mounted.

Figure 16:
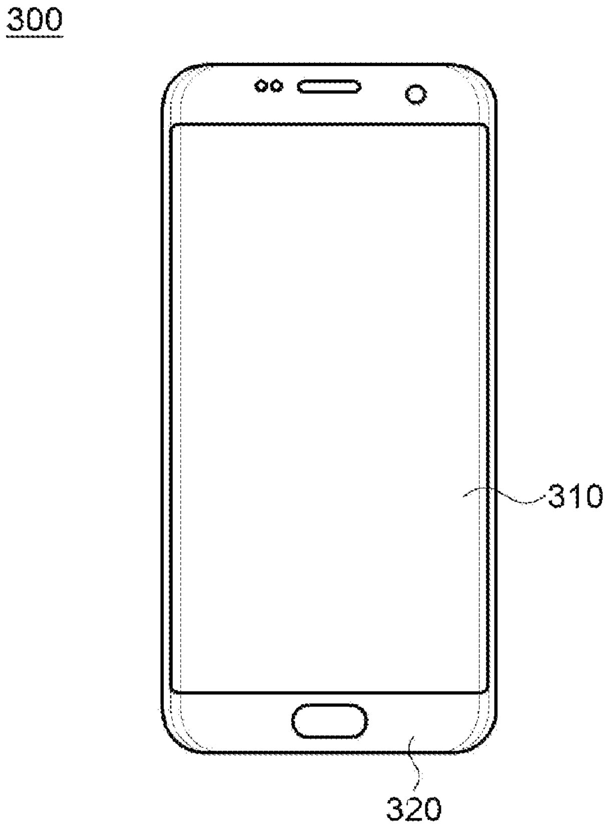
FIG. 16 is a schematic plan view of a display device according to exemplary embodiments.

FIG. 16 is a schematic plan view of a display device according to exemplary embodiments. For example, FIG. 16 shows an external shape including a window of the display device.

Referring to FIG. 16, the display device 300 may include a display region 310 and a peripheral region 320. The peripheral region 320 may be disposed on both sides and/or both ends of the display region 310, for example.

In some embodiments, the antenna pattern layer 120 included in the above-described antenna structure may be inserted into the peripheral region 320 of the display device 300 in a form of a patch. In some embodiments, the signal pads 127 and 128 and the ground pad 129 of the antenna pattern layer 120 may be disposed so as to correspond to the peripheral region 320 of the display device 300.

The peripheral region 320 may correspond to a light-shielding part or a bezel part of the image display device, for example. According to exemplary embodiments, the flexible printed circuit board 200 of the antenna structure may be disposed in the peripheral region 320 to prevent degradation of images in the display region 310 of the display device 300.

In addition, the driving IC chip 280 may be disposed on the flexible printed circuit board 200 together in the peripheral region 320. By arranging the signal pads 127 and 128 of the antenna pattern layer 120 so as to be adjacent to the flexible printed circuit board 200 and the driving IC chip 280 within the peripheral region 320, signal loss may be suppressed by shortening a path for transmitting and receiving signals.

The radiator 121 of the antenna pattern layer 120 may at least partially overlapped with the display region 310. For example, as shown in FIG. 16, it is possible to reduce the radiator 121 from being viewed by the user by utilizing the mesh structure.

Example 1

As shown in FIG. 8, an antenna structure was prepared by forming a radiator having a mesh structure and two transmission lines extending in a direction orthogonal to each other from both vertices of the radiator on the dielectric layer.

The two transmission lines were bent in a direction parallel to each other to form parallel portions, and the two parallel portions were respectively connected to two signal pads.

Ground pads were formed between the two signal pads and on both sides thereof.

The two signal pads were connected with a driving IC chip through a flexible printed circuit board.

Experimental Example—Confirmation of Polarization Characteristics

Figure 17:
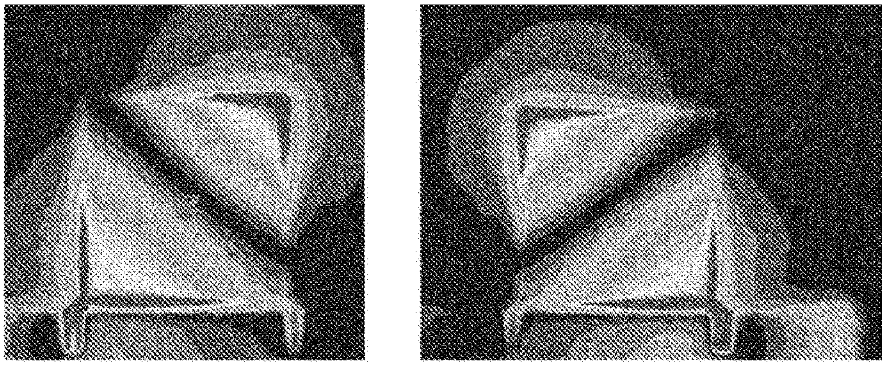
FIGS. 17 and 18 are diagrams illustrating radiation patterns during operation of the antenna structure according to exemplary embodiments.

An analysis of electromagnetic field was performed on the antenna structure of Example 1 while supplying a driving signal to the radiator through a left signal pad in the driving IC chip, thus to obtain the diagram on the left side of FIG. 17.

Further, another analysis of the electromagnetic field was performed thereon 1 while supplying a driving signal to the radiator through a right signal pad in the driving IC chip, thus to obtain the diagram on the right side of FIG. 17.

The electromagnetic field diagram of FIG. 17 was obtained at a frequency of about 24 to 29.5 GHz and about 37 to 40 GHz using HFSS simulation from Ansys.

Referring to FIG. 17, it was confirmed that, when the antenna structure was driven through the left transmission line and the right transmission line, respectively, left and right symmetrical electromagnetic field patterns appeared.

Figure 18:
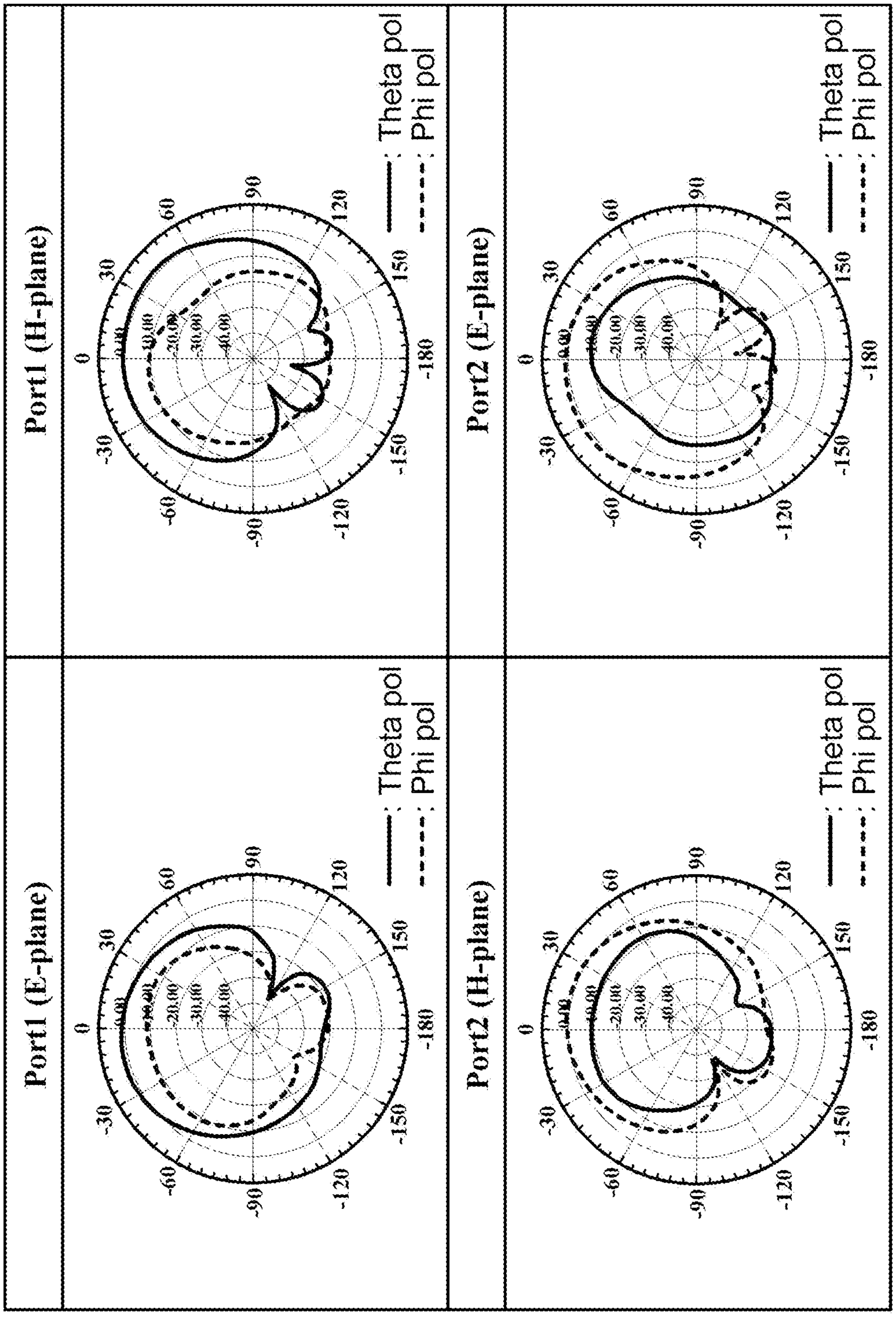

FIG. 18 is a radiation pattern of E-plane and H-plane of the antenna structure when driving through a left signal pad Port 1 and a right signal pad Port 2.

It was confirmed that, when the antenna structure was driven through each of the left signal pad and the right signal pad, left and right symmetrical radiation patterns as a whole appeared. Referring to the radiation patterns, it can be seen that a similar level of gain was obtained.

Specifically, a Theta pol radiation pattern and a Phi pol radiation pattern in the E-plane of Port 1 appeared to be substantially symmetrical with a Phi pol radiation pattern and a Theta pol radiation pattern in the H-plane of Port 2, respectively, and the Theta pol radiation pattern and the Phi pol radiation pattern in the H-plane of Port 1 appeared to be substantially symmetrical with the Phi pol radiation pattern and the Theta pol radiation pattern in the E-plane of Port 2, respectively.

In this case, it was confirmed that a difference between a co-polarization level (Theta pol; H-pol) and a cross-polarization level (Phi pol; V-pol) was 10 dBi or more, the gain for the Theta pol signal appeared higher than the case of driving through the left signal pad, and the gain for the Phi pol signal appeared higher than the case of driving through the right signal pad.

Examples 2 and 3

An antenna array was formed by arranging the antenna structure of FIG. 4 as the arrangement of FIG. 8 (Example 2). In addition, an antenna array as shown in FIG. 12 was formed by arranging the antenna structure of FIG. 4 (Example 3).

Experimental Example—Confirmation of Antenna Gain

Gains of the antenna array of Example 2 and the antenna array of Example 3 were measured, and consequently, results as described in Table 1 below were obtained.

TABLE 1

| Frequency | Example 2 | | Example 3 | |
|---|---|---|---|---|
| (GHz) | Co-pol | Cross-pol | Co-pol | Cross-pol |
| 27 | +9.10 | −8.98 | +12.60 | −4.02 |
| 28 | +9.79 | −4.32 | +12.64 | −5.75 |
| 29 | +9.95 | +0.50 | +11.06 | −4.08 |

Referring to Table 1, it can be seen that the co-polarization gain of Example 3 is larger than that of Example 2.

What is claimed is:

1. An antenna structure comprising:

a dielectric layer;

a radiator disposed on the dielectric layer, the radiator comprising a mesh structure;

a first signal pad configured to supply a first input signal to the radiator;

a second signal pad configured to selectively supply a second input signal to the radiator;

a first transmission line configured to connect the first signal pad to the radiator; and a second transmission line configured to connect the second signal pad to the radiator, wherein a side of the radiator, to which the first transmission line and the second transmission line are connected, comprises an edge pattern defining one edge of the radiator.

2. The antenna structure according to claim 1, wherein an angle between an extension direction of the first transmission line and an extension direction of the second transmission line is 80° to 100°.

3. The antenna structure according to claim 1, wherein the radiator has a regular polygonal shape, and the first transmission line and the second transmission line are respectively connected to two adjacent sides of the regular polygon.

4. The antenna structure according to claim 1, wherein the first transmission line and the second transmission line are formed in parallel to imaginary extension lines which respectively extend from a center of the radiator to two adjacent vertices of the radiator.

5. The antenna structure according to claim 4, wherein the first transmission line and the second transmission line are bent parallel to a long side direction or a short side direction of the radiator.

6. The antenna structure according to claim 1, wherein the first transmission line and the second transmission line have a solid structure.

7. The antenna structure according to claim 1, wherein vertices of the radiator, to which the first transmission line and the second transmission line are connected, comprise impedance matching patterns having a solid structure.

8. The antenna structure according to claim 1, wherein the mesh structure includes first unit lines and second unit lines which intersect each other, and some of the first unit lines are disposed on the extension line of the first transmission line, and some of the second unit lines are disposed on the extension line of the second transmission line.

9. The antenna structure according to claim 1, wherein lengths of the first transmission line and the second transmission line are the same as each other.

10. The antenna structure according to claim 1, wherein the first signal pad and the first transmission line are symmetrical to the second signal pad and the second transmission line with respect to a center line of the radiator.

11. The antenna structure according to claim 1, further comprising a driving integrated circuit chip configured to supply the first input signal and the second input signal to the first signal pad and the second signal pad, respectively.

12. The antenna structure according to claim 11, further comprising a flexible printed circuit board which includes a circuit wiring electrically connected with the first signal pad and the second signal pad, and the driving integrated circuit chip is disposed on the flexible printed circuit board and is electrically connected to the circuit wiring.

13. The antenna structure according to claim 1, wherein the first input signal and the second input signal are independently supplied, wherein one of a vertical polarization and a horizontal polarization is implemented by the first input signal, and the other one of the vertical polarization and the horizontal polarization is implemented by the second input signal.

14. The antenna structure according to claim 1, further comprising an antenna ground layer disposed on a lower surface of the dielectric layer.

15. A display device comprising the antenna structure according to claim 1.

* * * * *